United States Patent
Kruschwitz et al.

(10) Patent No.: US 6,621,615 B2
(45) Date of Patent: Sep. 16, 2003

(54) METHOD AND SYSTEM FOR IMAGE DISPLAY

(75) Inventors: Brian E. Kruschwitz, Rochester, NY (US); Marek W. Kowarz, Rochester, NY (US); Reinhold Thiel, Leutenbach (DE)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/102,109

(22) Filed: Mar. 19, 2002

(65) Prior Publication Data

US 2003/0021002 A1 Jan. 30, 2003

Related U.S. Application Data

(60) Provisional application No. 60/307,829, filed on Jul. 25, 2001.

(51) Int. Cl.$^7$ .............................. G02F 1/03; G02F 1/01; H01S 3/10; H04N 5/74
(52) U.S. Cl. ..................... 359/264; 359/238; 359/276; 359/291; 359/340; 359/158; 359/184; 372/10; 372/22; 372/25; 348/750; 348/760
(58) Field of Search ................... 359/264, 238, 359/276, 290, 291, 340, 158, 184, 188; 372/10, 22, 23, 25, 92, 97; 348/750, 756, 760

(56) References Cited

U.S. PATENT DOCUMENTS

| | | | | |
|---|---|---|---|---|
| 5,311,351 A | * | 5/1994 | Chesnoy | 359/264 |
| 5,548,433 A | * | 8/1996 | Smith | 359/158 |
| 5,740,190 A | | 4/1998 | Moulton | 372/23 |
| 5,828,424 A | | 10/1998 | Wallenstein | 348/760 |
| 6,008,929 A | * | 12/1999 | Akimoto et al. | 359/264 |
| 6,233,025 B1 | | 5/2001 | Wallenstein | 348/750 |
| 6,233,089 B1 | | 5/2001 | Nebel | 359/330 |
| 6,307,663 B1 | | 10/2001 | Kowarz | 359/231 |
| 6,459,522 B2 | * | 10/2002 | Yariv | 359/264 |

OTHER PUBLICATIONS

Eric Takeuchi, et al., "Laser Digital Cinema" from Projection Displays VIII, Ming H. Wu, Editor, Proceedings of SPIE vol. 4294 (2001) pp. 28–35.
USSN: 09/867,927 filed May 30, 2001 by Kowarz et al.

\* cited by examiner

*Primary Examiner*—Loha Ben
(74) *Attorney, Agent, or Firm*—Thomas H. Close; Stephen H. Shaw

(57) ABSTRACT

A light-modulating system, includes: a light source for emitting a sequence of light pulses at a period $T_p$; a light modulator having a variable-width switching profile with rise and fall times $T_r$ and $T_f$ respectively, wherein the greater of $T_r$ and $T_f$ is greater than $T_p$, the light modulator modulating the sequence of light pulses; and a controller for controlling the width of the variable-width light switching profile.

27 Claims, 3 Drawing Sheets

METHOD AND SYSTEM FOR IMAGE DISPLAY

CROSS REFERENCE TO RELATED APPLICATIONS

This is a 111A application of Provisional Application Serial No. 60/307,829 filed Jul. 25, 2001, by Kruschwitz et al., entitled "Illumination System."

FIELD OF THE INVENTION

The invention relates to a method for producing an image from a video data stream and a system for projecting images from a video data stream. Specifically, the invention relates to the use of a spatial light modulator that uses a pulse-width-modulation scheme to modulate the light beam from one or more pulsed laser sources.

BACKGROUND OF THE INVENTION

Projection display systems for the display of motion images from a video data stream have been known in the prior art. Typically, these systems have comprised a white light source, most notably a xenon arc lamp, illuminating one or more spatial light modulators to form the desired image. Lasers have been known to be an attractive alternative to arc lamps for projection displays. Potential advantages are wide color gamut featuring very saturated colors, simple, low-cost, efficient optical systems, and higher contrast with some spatial light modulators. Potential disadvantages of laser-based projectors are speckle and the lack of economical high-power lasers currently available at the appropriate visible wavelengths.

There is a limited selection of lasers that can be considered for use in cinema projection display systems. Gas lasers (argon-ion for blue and green emission and krypton for red emission) have been considered, but are undesirable due to the significant cooling and power required, and the limited selection of wavelengths for the color primaries. Diode lasers are another potential technology, but current materials cannot directly emit blue or green light at an appropriate wavelength or power. Frequency-doubled diode lasers are an alternative, but are not sufficiently advanced to consider for a cinema application.

Diode-pumped solid state lasers are another class of lasers appropriate for consideration. The laser transitions actually produce light in the infrared portion of the spectrum. However, it is well-known in the prior art that nonlinear optics can be used to upconvert the infrared light into visible light. Furthermore, a laser with an optical parametric oscillator can be used to generate one or more intermediate wavelengths from which red, green, and blue light can be produced through upconversion. This type of system has been disclosed by Wallenstein in U.S. Pat. Nos. 5,828,424 issued Oct. 27, 1998 and 6,233,025 issued May 15, 2001; by Nebel in U.S. Pat. No. 6,233,089 issued May 15, 2001; and by Moulton in U.S. Pat. No. 5,740,190 issued Apr. 14, 1998. The conversion efficiency in the nonlinear optical system required for the generation of red, green, and blue light can be made very high if a pulsed solid-state laser source is used. For example, Wallenstein discloses the use of a mode-locked laser oscillator while Moulton teaches the use of a Q-switched laser oscillator.

Turning to the spatial light modulator, a large variety of modulators have been used. A continuous illumination source, such as an arc lamp or a continuous-wave laser, allows significant flexibility in the modulation scheme used with the modulator. Some spatial light modulators utilize a pulse-width modulation scheme in order to modulate a light beam with image data. Each individual pixel in the array can be switched into an "on" state that directs incident light to the screen for a time given by a multiple of a least-significant-bit (LSB) time. Tone scale is achieved in an individual pixel by controlling the ratio of the on times to the total time available for display of the pixel. Examples of spatial light modulators that can be operated in a pulse-width-modulation scheme are electromechanical grating devices, such as the conformal Grating ElectroMechanical System (GEMS) from Eastman Kodak Company and the Grating Light Valve (GLV) from Silicon Light Machines, micromirror array devices such as the Digital Light Processing (DLP) chip from Texas Instruments, and liquid crystal light valves.

Pulse-width-modulation is a desirable method of encoding digital image data in a display system. An advantage of pulse-width-modulation is that the application of the signal does not require a well-controlled voltage level from an analog voltage source. Hence, the modulation scheme is closer to being truly digital in that noise in the modulation process is determined by more easily controlled factors such as timing jitter. Additional advantages are reduced susceptibility to electrical crosstalk from adjacent pixels, to noise from electromagnetic interference, and to drifts from temperature variations.

A disadvantage of pulse-width-modulation is the difficulty with which gamma correction can be performed. Poynton, in Chapter 5 of *A Technical Introduction to Digital Video*, explains that due to the nonlinearity in the human visual response to luminance, the bit spacing between adjacent dark bit levels is required to be smaller than that between adjacent bright bit levels. Thus, when using a pulse-width modulation scheme, approximately 3–4 linear bits are lost in the gamma correction process. The result is that for a high-quality image, >12 linear bits/color are required, with 13–14 being optimum.

A second disadvantage arises when a periodically-pulsed laser beam illuminates an ideal modulator. In this scenario, the application of a varying pulse width to the modulator acts to vary the number of laser pulses that are passed through to the screen. This is known as pulse number modulation. A problem arises if the time between laser pulses is longer than the LSB time of the spatial light modulator. In this event, the bit depth of the image is limited by the laser pulse repetition rate rather than the LSB time, and therefore the image is not faithfully reproduced. With a scanned linear light-valve display, this phenomenon could result in banding artifacts to which human observers are very sensitive.

The problem of the laser pulse period being longer than the LSB time of the modulator can easily occur. For example, stability requirements in mode-locked lasers can limit many desirable laser systems to repetition rates of <200 MHz, or 5 ns laser pulse period. However, a linear light valve system with 2000 scanned lines of resolution at 48 frames per second and 13 linear bits per color per frame would produce an LSB time of approximately 1 ns, so the achieved tone scale would be laser limited. As another example, a Q-switched laser is practically limited to repetition rates of <100 kHz (for a minimum of 10 $\mu$s between laser pulses), whereas an area spatial light modulator system with 13 linear bits per color per frame would produce an LSB time of approximately 2 $\mu$s.

Takeuchi et al in "Laser Digital Cinema™," (*Projection Displays VII*, SPIE v. 4294, pp. 28–35 (2001)) discuss the use of a Q-switched RGB laser with a pulse-width-modulated micromirror array for a laser projection display system. However, the tone scale in their investigation was limited to 10 linear bits/color or less because of the switching speed of the modulator. Further, the laser pulses were required to be carefully synchronized with the modulation signal.

The object of the invention is to provide a display system that contains a pulsed laser source and a pulse-width-modulated light valve wherein the laser pulse repetition rate does not significantly limit the bit depth. The system does not produce a loss of tone scale or increase in noise in the image when the time between emitted laser pulses is longer than the least-significant-bit (LSB) time.

There is a need, therefore, for an improved method and system for image display using a pulsed laser source that can be used with a pulse-width-modulated light valve in a display system.

SUMMARY OF THE INVENTION

The need is met according to the present invention by providing a light-modulating system that includes: a light source for emitting a sequence of light pulses at a period $T_p$; a light modulator having a variable-width switching profile with rise and fall times $T_r$ and $T_f$ respectively, wherein the greater of $T_r$ and $T_f$ is greater than $T_p$, the light modulator modulating the sequence of light pulses; and a controller for controlling the width of the variable-width switching profile.

ADVANTAGES

The illumination system of the present invention has the advantages that the use of a pulsed laser source does not significantly limit the bit depth and does not result in a loss of tone scale or increase in noise in the image when the time between emitted laser pulses is longer than the least-significant-bit (LSB) time.

DETAILED DESCRIPTION OF THE INVENTION

Figure 1:
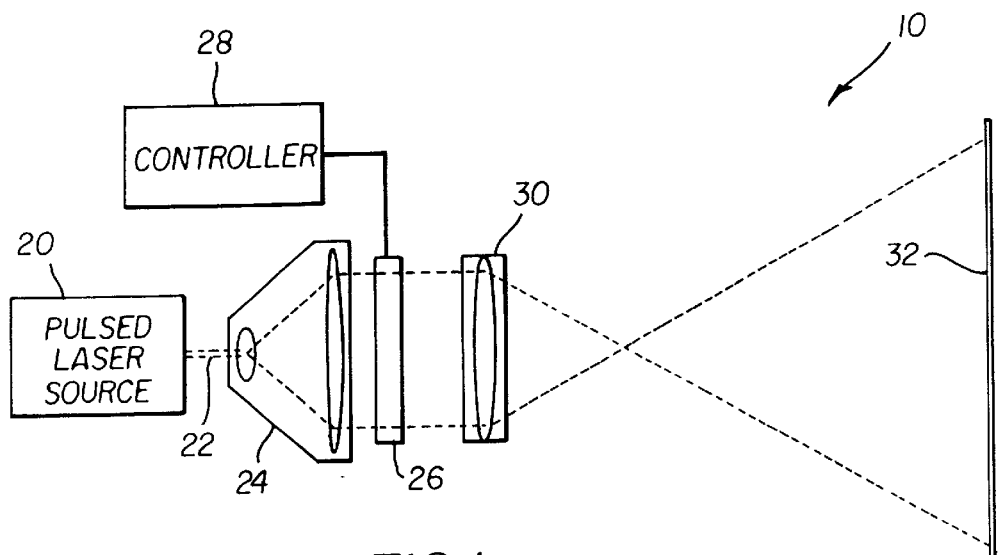
FIG. 1 shows the laser projection display system.

FIG. 1 shows a laser projection display system 10 incorporating the invention. A pulsed laser source 20 emits a light beam 22 that is composed of a periodic sequence of pulses that are emitted at a regular interval. The laser illuminates a spatial light modulator 26, or light valve, which is composed of an array of modulator elements called pixels. A controller 28, which is responsive to image data, controls the spatial light modulator by applying pulse-width-modulated drive signals. Light passed by the spatial light modulator 26 is collected by the projection lens 30, which projects the image to a display screen 32.

The pulsed laser source 20 can be Q-switched or mode-locked. It preferably comprises a diode-pumped solid state laser such as Nd:YAG, Nd:YLF, Nd:YVO$_4$, or Yb:YAG to generate infrared light, and nonlinear optics to convert the infrared to visible light. However, it could comprise any other type of laser for the generation of infrared light, such as a diode laser, a lamp-pumped solid state laser, a gas laser, or a fiber laser. Alternatively, the pulsed laser source 20 could utilize a laser that emits directly into the visible, such as a diode laser or a gas laser.

Turning to the spatial light modulator 26, the pixels on the spatial light modulator 26 can be arrayed over an area two-dimensionally or along a line. The spatial light modulator 26 is preferably a linear electromechanical grating modulator, for example a conformal GEMS device (see U.S. Pat. No. 6,307,663, issued Oct. 23, 2001 to Kowarz, and CIP application Ser. No. 09/867,927 filed May 30, 2001), or a Grating Light Valve. However, it could be another linear modulator, (e.g. a linear micromirror array, an electro-optic TIR modulator, or a linear liquid crystal array) or an area array (e.g. a micromirror array or a liquid crystal panel). The pixels in the spatial light modulator 26 are operated in a binary mode. In other words, at any instant, a pixel is intended to either be in an "on" state, during which incident light is passed through to the image, or in an "off" state, during which incident light is obscured from the image.

The beam-shaping optics 24 preferably produce a uniform illumination area matching the area of the spatial light modulator 26. Appropriate examples are well-known in the art, and include illumination schemes using fly's eye integrators, integrating bars or "light pipes", diffractive top-hat generators, Powel lenses, and aspheric top-hat generators. The beam-shaping optics 24 can also be a simple beam expander, for example using an afocal pair of lenses. For linear spatial light modulators, the beam-shaping optics 24 should be anamorphic in order to produce a uniform illumination along the length of the array and illumination matched to the requirements of the light valve in the cross-array direction. In the preferred embodiment using a linear electromechanical grating array, the beam should be focused in the cross-array direction onto the spatial light modulator 26.

The projection optics 30 can comprise a standard projection lens, such as those available from ISCO If the spatial light modulator 26 is a linear array, the projection optics 30 will also comprise a scanner for scanning image lines across the screen 32 to form a two-dimensional image. In the preferred embodiment, the scanner is a mirror mounted to a galvanometer, although other scanning methods can be used, for example a spinning polygon or a rotating prism.

The controller 28 applies a pulse-width-modulated signal having a variable width switching profile to each pixel in the spatial light modulator that is used for image control. The gray level of a pixel is controlled by switching the pixel into the "on" state for a controlled time, which is a multiple of a least-significant-bit (LSB) time.

Figure 2:
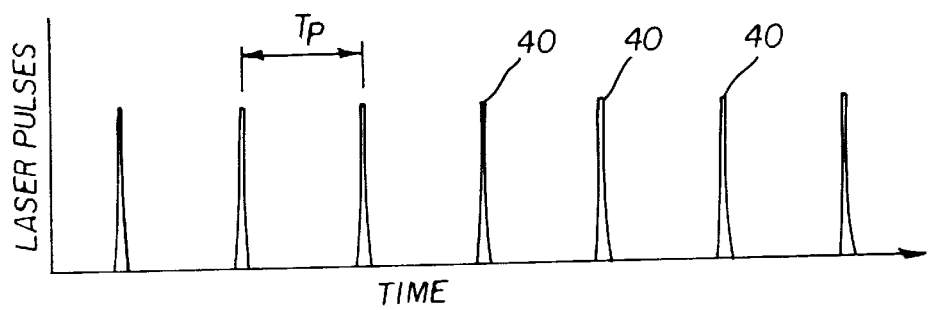
FIG. 2 is a graph showing the time dependence of the pulsed power emitted from the laser source.
Figure 3A:
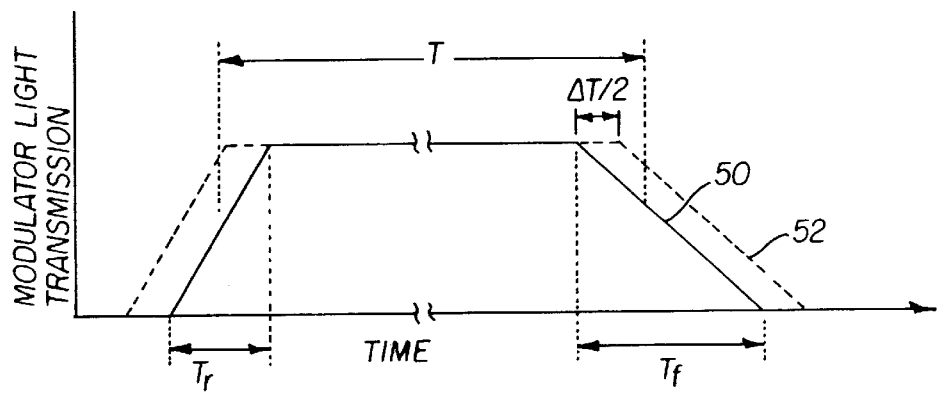
FIG. 3A is a graph showing the pulse response of the spatial light modulator to an electrical drive waveform and pulse width modulation of the spatial light modulator.
Figure 3B:
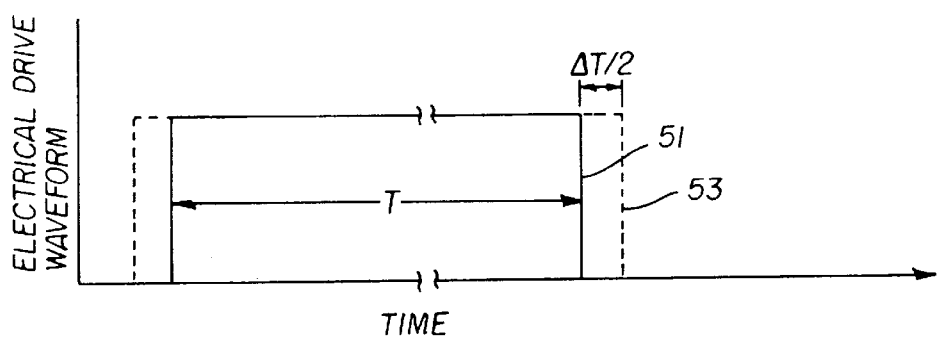
FIG. 3B is a graph showing the electrical drive waveform used to activate the spatial light modulator.
Figure 4:
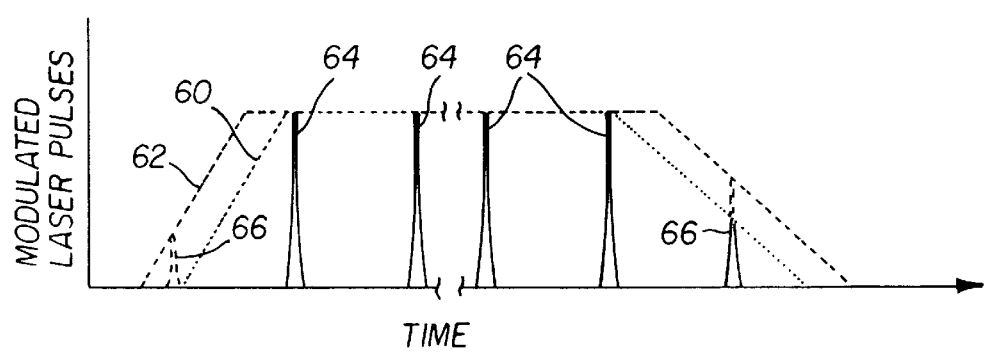
FIG. 4 is a graph illustrating how laser pulses are affected by a pulse-width modulated spatial light modulator according to the present invention.

FIGS. 2 through 4 illustrate the process of modulating a pulsed light source through pulse-width-modulation. FIG. 2 is a diagram showing the time characteristic of the laser pulses emitted from the pulsed laser source 20. The pulses are separated in time by a laser pulse period $T_p$. The laser pulse period is related to the more often quoted pulse repetition rate, $f_{rep}$, by $T_p=1/f_{rep}$. The pulses in the preferred laser sources, i.e. mode-locked or Q-switched solid state lasers, are very narrow compared to the laser pulse period. For example, in a typical mode-locked laser, the repetition rate is on the order of 100 MHz and the pulse width is on the order of 10 ps, for a duty cycle (ratio of pulse width to pulse period) of 0.1%. For a typical Q-switched laser, the pulse width is <10 ns and the repetition rate is on the order of 20 kHz, for an even smaller duty cycle.

FIGS. 3A and 3B show the dynamic switching characteristic of the spatial light modulator 26. The plot in FIG. 3A shows the optical response to the electrical drive waveform of FIG. 3B. FIG. 3A shows that the spatial light modulator does not switch instantaneously, but changes from the off-state to the on-state within a rise time $T_r$. Similarly, the spatial light modulator switches from the on-state into the off-state with a fall-time $T_f$. These switching times are dictated by a combination of the electrical switching times, shown here as instantaneous, and the response time of the modulator itself. For the example of an electromechanical grating spatial light modulator, the rise and fall times can be dictated by the electromechanical response of the micromechanical elements. FIG. 3A shows an idealized case in which the rising and falling transitions are linear. Actual transition behavior is typically nonlinear with an exponential behavior for over-damped systems and oscillatory behavior for under-damped systems. The actual switching behavior can have an effect on the amount of residual noise, but does not limit the present invention FIGS. 3A and 3B also show how pulse-width modulation is used to modulate a light beam. Two modulator pulses are shown corresponding to adjacent gray levels. The first modulation pulse 50 resulting from drive waveform 51 has a modulation pulse width T, which is an integral multiple of the LSB time ΔT. The second modulation pulse 52 resulting from drive waveform 53 has a modulation pulse width of T+ΔT, and therefore differs from the first modulation pulse 50 by one gray level. With a constant illumination, the exposure of the screen from these two modulation pulses would be proportional to the time integrals of the pulses.

Note that, because the switching speeds of available spatial light modulators are relatively slow compared to the LSB time requirements of the display system, the rise and fall times, $T_r$ and $T_f$, of the spatial light modulator 26 are much longer than the LSB time ΔT. For example, an electromechanical grating modulator can have a switching time of approximately 30 ns, whereas the LSB time for a 13 linear bit/color display system can be approximately 1 ns. The operation of the pulse-width modulated system does not require the spatial light modulator 26 to switch faster than the LSB time. The switching must only be done with timing jitter smaller than the LSB time.

Also note that FIGS. 3A and 3B illustrate a single center-weighted pulse applied to the spatial light modulator. Non-center-weighted pulses or more complicated modulation schemes utilizing multiple pulses are also common and are considered to be within the scope of the present invention.

FIG. 4 shows how the modulation pulses in FIG. 3A act on the laser pulses in FIG. 2. The laser pulses are modulated according to a first modulation envelope 60 (corresponding to the first modulation pulse 50) and a second modulation envelope 62 (corresponding to the second modulation pulse 52). It is important to note that the laser pulse period $T_p$ is much longer than the LSB time ΔT. Hence, the ideal scenario of instantaneous switching would suggest that the bit depth would be limited by the laser pulse repetition rate. However, as FIG. 4 illustrates, this is only strictly true if the laser pulse period $T_p$ is also greater than the rise and fall times, $T_r$ and $T_f$, of the spatial light modulator 26. In fact, the modulation bit depth is retained as long as the following condition is met:

$$T_p \leq \max(T_r, T_f), \tag{1}$$

where max( ) denotes the greater of the arguments.

Physically, this condition (1) dictates that there is always a laser pulse in either or both of the rising and falling edges of a modulation pulse. As illustrated in FIG. 4, the modulation scheme is not a simple pulse number modulation of the laser pulses. Rather, there are fully transmitted pulses 64 that are number modulated within the window defined by the time at which the modulation pulse has achieved a fully on state and the time at which the modulation pulse begins to switch off. There are also partially transmitted pulses 66 that lie on the transitions of the modulation pulses, which are amplitude modulated differently by the first and second modulation envelopes 60 and 62. This amplitude modulation is critical, because otherwise the optical response to the two modulation pulses in FIG. 4 would be identical and the two gray levels would be redundant.

An important aspect of the invention is that synchronization between the laser pulses and the spatial light modulator is not required. This asynchronous operation capability is important for passively mode-locked laser systems because it obviates the need for a fast pulse sensing and synchronization circuit. Because of the lack of synchronization, the relative phase of the laser pulse sequence and the modulator pulse is random, and this can be a source of noise as the laser pulses sample the spatial light modulator transitions at different times.

Therefore, the condition (1) should be considered a minimum requirement. For optimum low-noise operation, a number of laser pulses should occur within the rising and falling edges of the modulation pulse. Generally, more laser pulses sampling the transitions leads to lower noise.

The invention has been described in detail with particular reference to certain preferred embodiments thereof, but it will be understood that variations and modifications can be effected within the spirit and scope of the invention.

PARTS LIST 10 laser projection display system
20 pulsed laser source
22 light beam
24 beam shaping optics
26 spatial light modulator
28 controller
30 projection optics
32 screen
40 laser pulses
50 first modulation pulse
51 first electrical pulse
52 second modulation pulse
53 second electrical pulse
60 first modulation pulse envelope
62 second modulation pulse envelope
64 transmitted pulses
66 partially transmitted pulses
T modulation pulse width
$T_r$ rise time
$T_f$ fall time
ΔT least-significant-bit (LSB) time
$T_p$ laser pulse period
$f_{rep}$ laser pulse repetition rate

What is claimed is:
1. A light-modulating system, comprising:
  a) a light source for emitting a sequence of light pulses at a period $T_p$;
  b) a light modulator having a variable-width switching profile with rise and fall times, $T_r$ and $T_f$, respectively, wherein the greater of $T_r$ and $T_f$ is greater than $T_p$, the light modulator modulating the sequence of light pulses; and c) a controller for controlling the width of the variable-width switching profile.

2. The light-modulating system claimed in claim 1 wherein the controller modulates the width of the variable-width switching profile by a multiple of a least-significant-bit time, and wherein the least-significant-bit time is shorter than $T_p$, whereby the light modulator operates to perform a combination of pulse number and pulse amplitude modulation.

3. The light-modulating system claimed in claim 1 wherein the light source comprises a mode-locked laser.

4. The light-modulating system claimed in claim 1 wherein the light source comprises a Q-switched laser.

5. The light-modulating system claimed in claim 1 wherein the light modulator comprises a linear array of pixels.

6. The light-modulating system claimed in claim 5 further comprising beam-shaping optics that cause a uniform illumination of the light modulator in the array direction and focus the light in the orthogonal direction.

7. The light-modulating system claimed in claim 1 wherein the light modulator is an electromechanical grating modulator.

8. The light-modulating system claimed in claim 1 wherein the light modulator is a Grating Light Valve.

9. The light-modulating system claimed in claim 1 wherein the light modulator comprises an area array of pixels.

10. The light-modulating system claimed in claim 9 further comprising beam-shaping optics that cause a uniform illumination over the area of the light modulator.

11. The light-modulating system claimed in claim 1 wherein the light modulator is a micromirror array.

12. The light-modulating system claimed in claim 1 wherein the light modulator is a liquid crystal panel.

13. A method for displaying images, comprising the steps of:

a) providing a sequence of light pulses having a period $T_p$;

b) directing the light pulses to a spatial light modulator having a plurality of individually-addressed pixels having a variable-width switching profile with rise and fall times, $T_r$ and $T_f$, respectively, wherein the greater of $T_r$ and $T_f$ is greater than $T_p$;

c) generating a sequence of drive pulses for each pixel on the spatial light modulator corresponding to a video data stream, the drive pulse widths being integral multiples of a least-significant-bit time; and d) applying the drive pulses to the pixels of the spatial light modulator to modulate the light pulses.

14. The method for displaying images claimed in claim 13 wherein the least-significant-bit time is less than $T_p$, whereby the spatial light modulator operates to perform a combination of pulse number and pulse amplitude modulation.

15. The method for displaying images claimed in claim 13 wherein the spatial light modulator comprises a linear array of pixels, and further comprising the step of scanning a line image generated by the spatial light modulator to form an area image.

16. The method for displaying images claimed in claim 13 wherein the spatial light modulator is an electromechanical grating device.

17. The method for displaying images claimed in claim 13 wherein the spatial light modulator is a grating light valve.

18. The method for displaying images claimed in claim 13 wherein the spatial light modulator comprises an area array of pixels.

19. The method for displaying images claimed in claim 13 wherein the spatial light modulator is a micromirror array.

20. The method for displaying images claimed in claim 13 wherein the spatial light modulator is a liquid crystal panel.

21. A display system, comprising:

a) a laser for emitting a sequence of light pulses at a period $T_p$;

b) a spatial light modulator having a plurality of individually-addressed pixels with a variable-width switching profile with rise and fall times, $T_r$ and $T_f$, respectively, wherein the greater of $T_r$ and $T_f$ is greater than $T_p$, the spatial light modulator modulating the sequence of light pulses; and c) a controller for modulating the width of the variable-width switching profile by a multiple of a least-significant-bit time that is shorter than $T_p$, whereby the spatial light modulator operates to perform a combination of pulse number and pulse amplitude modulation.

22. The display system claimed in claim 21 wherein the laser is mode locked.

23. The display system claimed in claim 21 wherein the laser is Q switched.

24. The display system claimed in claim 21 wherein the spatial light modulator is an electromechanical grating modulator.

25. The display system claimed in claim 21 wherein the spatial light modulator is a grating light valve.

26. The display system claimed in claim 21 wherein the spatial light modulator is a micromirror array.

27. The display system claimed in claim 21 wherein the spatial light modulator is a liquid crystal panel.

* * * * *